US011267063B2

(12) United States Patent
Schaefer

(10) Patent No.: US 11,267,063 B2
(45) Date of Patent: Mar. 8, 2022

(54) METHOD FOR OPERATING A SOLDERING DEVICE, SOLDERING DEVICE

(71) Applicant: ERSA GmbH, Wertheim (DE)

(72) Inventor: Michael Schaefer, Kuelsheim (DE)

(73) Assignee: ERSA GmbH, Wertheim (DE)

( * ) Notice: Subject to any disclaimer, the term of this patent is extended or adjusted under 35 U.S.C. 154(b) by 0 days.

(21) Appl. No.: 16/628,422

(22) PCT Filed: Jul. 2, 2018

(86) PCT No.: PCT/EP2018/067748
§ 371 (c)(1),
(2) Date: Jan. 3, 2020

(87) PCT Pub. No.: WO2019/007873
PCT Pub. Date: Jan. 10, 2019

(65) Prior Publication Data
US 2020/0156169 A1 May 21, 2020

(30) Foreign Application Priority Data
Jul. 5, 2017 (DE) .................. 10 2017 114 954.6

(51) Int. Cl.
*B23K 3/00* (2006.01)
*B23K 3/08* (2006.01)
(Continued)

(52) U.S. Cl.
CPC ............... *B23K 3/08* (2013.01); *B23K 1/085* (2013.01); *B23K 3/0653* (2013.01); *G01B 11/0608* (2013.01)

(58) Field of Classification Search
CPC ........ B23K 3/08; B23K 1/085; B23K 3/0653; G01B 11/0608
(Continued)

(56) References Cited

U.S. PATENT DOCUMENTS 4,724,994 A * 2/1988 Flury .................. B23K 3/0653
228/37
4,889,273 A * 12/1989 Kondo ................ B23K 3/0653
228/8

(Continued)

FOREIGN PATENT DOCUMENTS

CN 1405339 A 3/2003
CN 102485407 A * 6/2012
(Continued)

OTHER PUBLICATIONS

International Search Report and Non-Translated Written Opinion Form PCT/ISA/210 and PCT/SA/237, International Application No. PCT/EP2018/067748, pp. 1-9, International Filing Date Jul. 2, 2018, dated Oct. 19, 2018.

(Continued)

*Primary Examiner* — Kiley S Stoner
(74) *Attorney, Agent, or Firm* — Bond Schoeneck & King, PLLC; George McGuire

(57) ABSTRACT

Method for operating a soldering device and soldering device, wherein a graphic representation of at least part of the soldering device is captured, wherein an instantaneous operating state of the soldering device is determined by means of automated processing of the graphic representation dependent on information about the soldering device from the graphic representation, characterized in that the information about the soldering device is determined dependent on a reference representation of at least part of the soldering device, wherein the reference representation is captured as a graphic representation or wherein the reference representation is read as a graphic representation from a memory, and in that the reference representation characterizes a degree of oxidation of solder (122) when the solder (122) flows out (Continued)

over at least part of a surface (124) of a soldering nozzle (116).

16 Claims, 4 Drawing Sheets

(51) Int. Cl.
 *B23K 1/08* (2006.01)
 *B23K 3/06* (2006.01)
 *G01B 11/06* (2006.01)
(58) Field of Classification Search
 USPC .......................... 228/103, 105, 8–12, 37, 260
 See application file for complete search history.

(56) References Cited

U.S. PATENT DOCUMENTS

| | | | | |
|---|---|---|---|---|
| 5,148,963 A | * | 9/1992 | Hicks | B23K 3/06 228/102 |
| 5,203,489 A | * | 4/1993 | Gileta | B23K 3/0653 228/219 |
| 7,628,308 B2 | * | 12/2009 | Ojima | B23K 1/08 228/102 |
| 2003/0116352 A1 | * | 6/2003 | Nakatsuka | H01R 43/0207 174/263 |
| 2004/0150714 A1 | | 8/2004 | Lin | |
| 2009/0050674 A1 | * | 2/2009 | Zen | B23K 3/0653 228/37 |
| 2009/0278875 A1 | * | 11/2009 | Holm | B23K 3/082 347/10 |
| 2011/0318886 A1 | * | 12/2011 | Tsao | H05K 3/1208 438/125 |

FOREIGN PATENT DOCUMENTS

| | | |
|---|---|---|
| CN | 105163890 A | 12/2015 |
| CN | 105324203 A | 2/2016 |
| EP | 2138259 A1 | 12/2009 |
| JP | H07131143 A | 5/1995 |
| WO | 2011009594 A1 | 1/2011 |

OTHER PUBLICATIONS

Non-translated German Office examination report of priority application, pp. 1-5, dated Apr. 13, 2018.
Chinese Office Action, dated Mar. 25, 2021. pp. 1-9.
Non translated CN Office Action, dated Sep. 10, 2021.

* cited by examiner

METHOD FOR OPERATING A SOLDERING DEVICE, SOLDERING DEVICE

CROSS-REFERENCES TO RELATED APPLICATIONS

This application is a national stage application under 35 U.S.C. 371 based on international patent application PCT/EP2018/067748 filed on Jul. 2, 2018, which claims priority to German Patent Application No. 10 2017 114 954.6 filed on Jul. 5, 2017, disclosures of both of which are incorporated herein by reference in their entireties.

BACKGROUND

The invention relates to a method for operating a soldering device and to a soldering device which is designed to carry out this method.

Conventional soldering devices comprise a crucible for solder and a soldering nozzle that protrudes from the crucible. Solder heated in the crucible is pumped through an opening of the soldering nozzle by means of an induction pump in a direction opposite to gravity. The solder flows along an outer surface of the soldering nozzle and back into the crucible due to gravity. This produces a solder wave.

In soldering operations, it is important to ensure the use of a suitable soldering nozzle and solder wave having suitable properties such as solder wave height and uniform outflow of the solder over a surface of the soldering nozzle.

JP H07-131143A and EP 2 138 259 A1 disclose methods for operating a soldering device and associated soldering devices having features of the preamble of claim 1.

SUMMARY OF THE INVENTION

The object of the invention is that of monitoring the soldering in a further improved manner.

This object is achieved by the method and the device according to the independent claims.

With regard to the method for operating the soldering device, a graphic representation of at least part of a soldering device is captured, an instantaneous operating state of the soldering device being determined by means of automated processing of the graphic representation depending on information about the soldering device from the graphic representation.

According to the invention, the information about the soldering device is determined depending on a reference representation of at least part of the soldering device, the reference representation being captured as a graphic representation or the reference representation being read as a graphic representation from a memory and the reference representation characterizing a degree of oxidation of the solder when the solder flows out over at least part of a surface of a soldering nozzle. This monitors the suitability of the soldering nozzle for the soldering process.

Advantageously, the reference representation characterizes a solder wave having a predetermined height. This makes it possible to evaluate a solder wave height without the soldering device having to perform a solder wave height measurement for each evaluation by means of a conventional method.

Advantageously, the reference representation is captured when an instantaneous solder wave reaches or exceeds the predetermined height. This allows the reference representation to be initiated easily. The time at which the predetermined height is reached is determined once, for example, on start-up by means of a conventional solder wave height measurement.

Advantageously, the reference representation is captured when a circuit through which a current flows through the instantaneous solder wave and a contact is closed, a crucible of the soldering device or a soldering nozzle of the soldering device being arranged in the soldering device in a predetermined position. As a result, the reference representation can be compared with a conventional solder wave measurement in an automated manner.

Advantageously, the information about the graphic representation is compared with information about the reference representation, where, depending on a result of the comparison, a deviation of an instantaneous height of the instantaneous solder wave from the predetermined height is detected and/or an operating state of the soldering device for solder wave height measurement is selectively permitted or prevented. This allows the selective use of a conventional method for measuring the solder wave height.

Advantageously, the reference representation characterizes a soldering nozzle which can be inserted into the soldering device. This checks, in an automated manner, whether the soldering nozzle meets the requirements of the soldering process.

Advantageously, information about the graphic representation is compared with information about the reference representation, where, depending on a result of the comparison, a soldering nozzle currently inserted in the soldering device is detected and/or an operating state of the soldering device for soldering using the inserted soldering nozzle is selectively permitted or prevented. This makes it possible to prevent the soldering process if an unsuitable soldering nozzle is inserted.

Advantageously, information about the graphic representation is compared with information about the reference representation, where, depending on a result of the comparison, an instantaneous degree of oxidation of the solder at soldering nozzle is detected and/or an operating state of the soldering device for breaking up an oxide layer is selectively permitted or prevented. This makes it possible to selectively use the process for breaking up the oxide layer.

With regards to the soldering device, it is provided that the soldering device comprises a capturing means and a computing means, the capturing means being designed to capture a graphic representation of at least part of the soldering device, the computing means being designed to determine an instantaneous operating state of the soldering device by means of automated processing of the graphic representation depending on information about the soldering device from the graphic representation. The capturing means used is preferably a digital camera. As a computing means, a computer is preferably used which is designed to control the soldering device. The computing means may also comprise a programmable logic controller.

In this case, the computing means is designed to determine the information about the soldering device depending on a reference representation of at least part of the soldering device, the capturing means being designed to capture the reference representation as a graphic representation, or the computing means being designed to read the graphic representation from a memory.

Advantageously, the capturing means is designed to capture the reference representation when an instantaneous solder wave (106) reaches or exceeds the predetermined height. As a result, the capturing means is triggered in an automated manner.

Advantageously, the capturing means is designed to capture the reference representation when a circuit through which a current flows through the instantaneous solder wave and a contact is closed, a crucible of the soldering device or a soldering nozzle of the soldering device being arranged in the soldering device in a predetermined position. As a result, the capturing means is triggered in an automated manner when the circuit is closed during a conventional solder wave height measurement.

Advantageously, the computing means is designed to compare information about the graphic representation with information about the reference representation, the computing means being designed, depending on a result of the comparison, to detect a deviation of an instantaneous height of the instantaneous solder wave from the predetermined height and/or to selectively permit or prevent an operating state of the soldering device for solder wave height measurement. The solder wave height measurement can therefore be initiated in a targeted manner.

Advantageously, the computing means is designed to compare information about the graphic representation with information about the reference representation, the computing means being designed, depending on a result of the comparison, to detect a soldering nozzle currently inserted in the soldering device and/or to selectively permit or prevent an operating state of the soldering device for soldering using the inserted soldering nozzle. The soldering process is ended if an unsuitable soldering nozzle has been detected.

Advantageously, the computing means is designed to compare information about the graphic representation with information about the reference representation, the computing means being designed, depending on a result of the comparison, to detect a an instantaneous degree of oxidation of the_solder at soldering nozzle and/or to selectively permit or prevent an operating state of the soldering device for breaking up an oxide layer. The process of breaking up the oxide layer is thus carried out selectively as needed.

BRIEF DESCRIPTION OF THE DRAWINGS

Further embodiments of the invention can be found in the following description and the drawings, in which.

DETAILED DESCRIPTION

Figure 1:
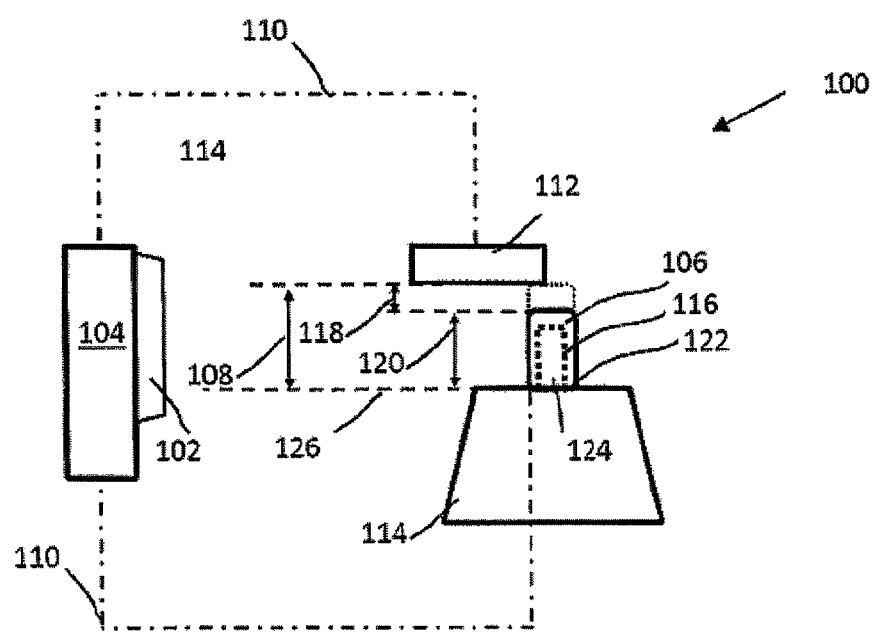
FIG. 1 schematically shows a soldering device,
FIG. 2 schematically shows a first method for operating the soldering device,
FIG. 3 schematically shows a second method for operating the soldering device,
FIG. 4 schematically shows a third method for operating the soldering device.

FIG. 1 schematically shows a soldering device 100. The soldering device 100 comprises a capturing means 102 and a computing means 104.

The capturing means 102 is designed to capture a graphic representation of at least part of the soldering device 100.

The computing means 104 is designed to determine an instantaneous operating state of the soldering device 100 by means of automated processing of the graphic representation depending on information about the soldering device from the graphic representation.

The capturing means 102 used is preferably a digital camera. As a computing means 104, a programmable logic controller is preferably used which is designed to control the soldering device.

The computing means 104 is designed to determine the information about the soldering device 100 depending on reference representation of at least part of the soldering device 100.

The capturing means 102 is designed to capture graphic representations of at least parts of the soldering device 100. For this purpose, the capturing means 102, for example the digital camera, is attached to the soldering device in such a way that digital images captured by the capturing means 102 depict these parts.

The computing means 104 is designed to receive the graphic representation or the reference representation from the capturing means and/or to read said representation from a memory.

The graphic representation, for example of a soldering nozzle 116 or a solder wave 106 having a predetermined height 108, is stored in the memory, for example as a reference representation. The capturing means 102 is optionally designed to capture the graphic representation of the reference representation and to store it in the memory.

The capturing means 102 is optionally designed to capture the reference representation when the instantaneous solder wave 106 reaches the predetermined height 108.

The capturing means 102 is optionally designed to capture the reference representation when a circuit 110 through which a current flows through the instantaneous solder wave 106 and a contact 112 is closed, a crucible 114 of the soldering device 100 or the soldering nozzle 116 of the soldering device 100 being arranged in the soldering device 100 in a predetermined position 126. The capturing means 102 is attached to the crucible 114, for example, and generates graphic representations that depict the solder wave 106.

As a contact 112, a needle is used, for example, which is connected via electrical lines to a first input of the computing means 104. A second input of the computing means 104 is connected to the solder 122 in the crucible 114, and thus to the solder wave 106, by electrical lines.

The computing means 104 is designed, for example, to carry out a control process in which the crucible 114 and the soldering nozzle 116 are moved into the predetermined position 126. Solder 122 heated in the crucible is then pumped through an opening of the soldering nozzle 116 by means of an induction pump in a direction opposite to gravity. The solder 122 flows along an outer surface 124 of the soldering nozzle 116 and back into the crucible 114 due to gravity. This produces the instantaneous solder wave 106.

When the instantaneous solder wave 106 touches the contact 112, the circuit 110 is closed. As a result, the capturing means 102 is triggered in an automated manner when the circuit 110 is closed. The power supply for the circuit 110 and the measurement of the current is carried out by the programmable logic controller, for example.

The computing means 104 is designed, for example, to compare information about the graphic representation with information about the reference representation. For this purpose, image processing software is used, the graphic representation is evaluated and information about the graphic representation is generated which can be compared with the information about the reference representation.

The computing means 104 is designed, for example, to detect a deviation 118 of an instantaneous height 120 of the instantaneous solder wave 106 from the predetermined height 108 depending on a result of the comparison.

The computing means 104 is designed, for example, to selectively permit or prevent an operating state of the soldering device 100 for solder wave height measurement.

For example, the computing means 104 is designed to detect, depending on a result of the comparison, a soldering nozzle 116 currently inserted in the soldering device 100.

For example, the computing means 104 is designed to selectively permit or prevent an operating state of the soldering device 100 for soldering using the inserted soldering nozzle 116.

For example, the computing means 104 is designed, depending on a result of the comparison, to detect an instantaneous degree of oxidation of the solder at the soldering nozzle 116 and/or to selectively permit or prevent an operating state of the soldering device 100 for breaking up an oxide layer. The process of breaking up the oxide layer is thus carried out selectively as needed.

By means of automated processing of the graphic representation, an instantaneous operating state of the soldering device 100 is determined depending on information about the soldering device 100 and information from the graphic representation. This is described by the example of the following methods.

The information about the soldering device 100 is determined depending on the reference representation of at least part of the soldering device 100, information about the reference representation being captured as a graphic representation or information about the reference representation being read from the memory.

Figure 2:
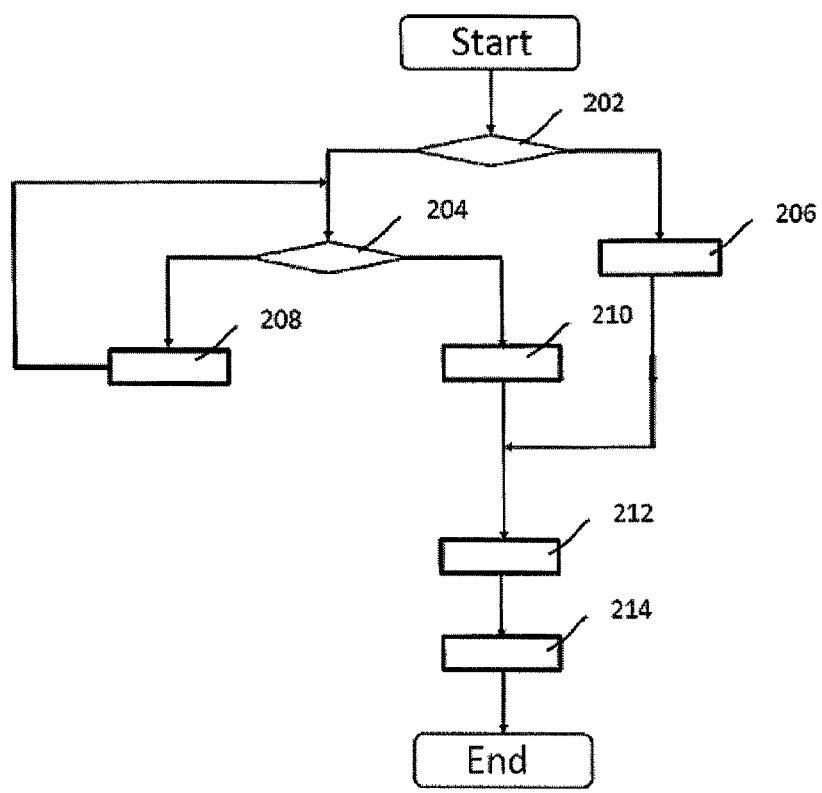

FIG. 2 schematically shows a first method for operating the soldering device 100. The first method is started, for example, when the soldering device 100 is switched on.

In this case, the reference representation characterizes a solder wave 106 having a predetermined height 108. This makes it possible to evaluate a solder wave height without the soldering device having to perform a solder wave height measurement for each evaluation by means of a conventional method.

After the start, it is checked in an optional step 202 whether the reference representation is already present in the memory. If the reference representation is not in the memory, an optional step 204 is carried out. Otherwise, a step 206 is carried out.

In step 204, it is checked whether the predetermined position 126 has been reached and the instantaneous height 120 of the solder wave 106 has reached the predetermined height 108. For example, it is checked whether the circuit 110 is closed. When the predetermined position 126 is reached and the instantaneous height 120 of the solder wave 106 has reached the predetermined height 108, an optional step 210 is carried out. Otherwise, an optional step 208 is carried out.

In step 208, the crucible 114 and the soldering nozzle 116 are moved to the predetermined position 126 and/or the pump power of the induction pump and thus the instantaneous height 120 of the solder wave 106 are increased. When the circuit 110 is closed, the current flows through the instantaneous solder wave 106 and the contact 112 while the crucible 114 of the soldering device 100 and/or the soldering nozzle 116 of the soldering device 100 are arranged in the soldering device 100 in the predetermined position 126.

Subsequently, step 204 is optionally carried out.

In step 210, the reference representation is captured.

The reference representation is captured when the instantaneous solder wave 106 reaches the predetermined height 108. This allows the reference representation to be initiated easily. The time at which the predetermined height is reached 108 is also determined once, for example, on start-up by means of a conventional solder wave height measurement.

After step 210, a step 212 is carried out.

In step 206, the reference representation is read from the memory. After step 206, step 212 is carried out.

In step 212, the graphic representation is captured. For example, a digital image representing at least part of the soldering device 100 is generated. In the example, the digital image shows a section on which at least the instantaneous height 120 of the instantaneous soldering wave 106 can be seen. This is achieved, for example, by suitably mounting the digital camera with respect to the crucible 114 or the soldering nozzle 116.

Subsequently, a step 214 is carried out.

In step 214, information about the graphic representation is compared with information about the reference representation.

Depending on a result of the comparison, a deviation 118 of an instantaneous height 120 of the instantaneous solder wave 106 from the predetermined height 108 is detected, for example.

For example, an operating state of the soldering device 100 for solder wave height management is selectively permitted or prevented. This can be carried out depending on or irrespective of the deviation 118.

The first method then ends. The first method may be repeated regularly or irregularly during operation of the soldering device 100.

Figure 3:
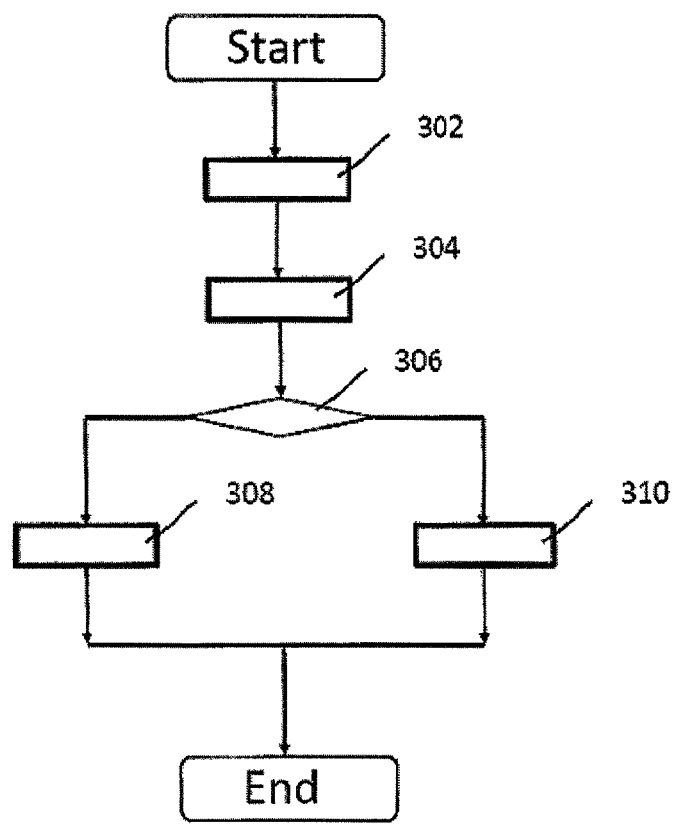

FIG. 3 schematically shows a second method for operating the soldering device 100.

In this case, the reference representation characterizes the soldering nozzle 116 which can be inserted into the soldering device 100.

After the start, the graphic representation is captured in a step 302, for example as an image of the digital camera.

Subsequently, a step 304 is carried out.

In step 304, a reference representation, for example a representation of at least one insertable solder nozzle, is read from the memory. For example, a nozzle database is used to search for the soldering nozzle that is suitable for the soldering process. For this representation, a representation previously stored in the database is read as a reference representation.

Subsequently, a step 306 is carried out.

In step 306, information about the graphic representation is compared with information about the reference representation. If the reference representation of the insertable soldering nozzle and the information about the graphic representation of the instantaneous soldering nozzle 116 match, a step 308 is carried out. Otherwise, a step 310 is carried out.

Depending on a result of the comparison, a soldering nozzle 116 currently inserted in the soldering device 100 is thus checked.

In step 308, an operating state of the soldering device 100 for soldering using the inserted soldering nozzle 116 is permitted. Subsequently, the second method is ended.

In step 310, an operating state of the soldering device 100 for soldering using the inserted soldering nozzle 116 is prevented. This makes it possible to prevent the soldering process if an unsuitable soldering nozzle is inserted. Subsequently, the second method is ended.

The second method may be repeated regularly or irregularly during operation of the soldering device 100.

Figure 4:
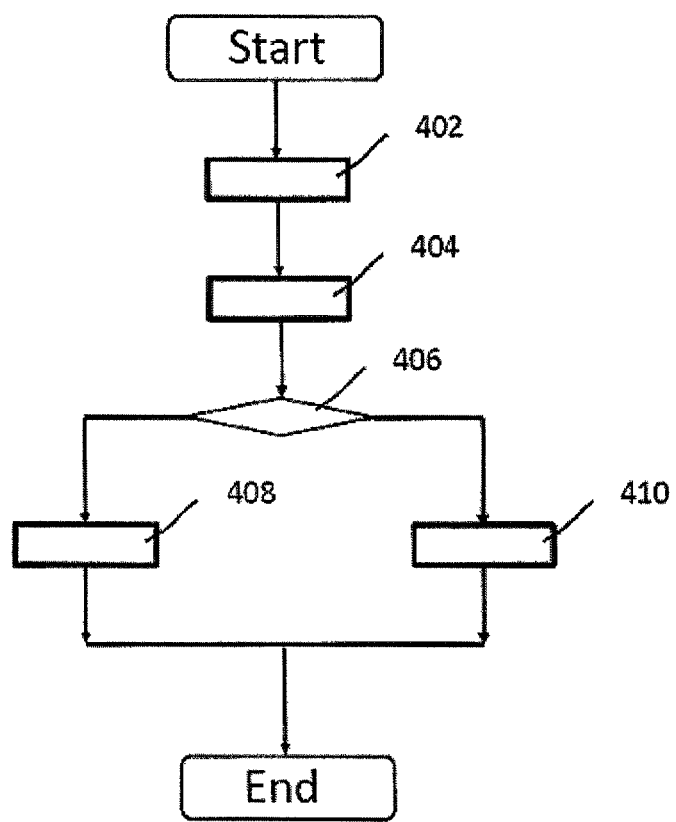

FIG. 4 schematically shows a third method for operating the soldering device 100.

In this case, the reference representation characterizes a degree of oxidation of the solder at soldering nozzle 116 during the outflow of the solder 122 over at least part of the surface 124 of the soldering nozzle 116 of the soldering device 100.

After the start, a graphic representation of at least part of the soldering device 110 is captured in a step 402, for example as a digital image of the camera.

Subsequently, a step 404 is carried out.

In step 404, a reference representation, for example a reference representation of a solder at the solder nozzle having a desired degree of oxidation, is read from the memory. For example, a database is used to search for the reference representation that reflects the desired degree of oxidation for the instantaneous soldering process. For this representation, a representation previously stored in the database is read as a reference representation.

Subsequently, a step 406 is carried out.

In step 406, information about the graphic representation is compared with information about the reference representation. If a threshold value for the degree of oxidation is not exceeded, a step 408 is carried out. Otherwise, a step 410 is carried out.

Depending on a result of the comparison, an instantaneous degree of oxidation of the solder 122 at soldering nozzle 116 is detected.

In step 408, an operating state of the soldering device 100 for breaking up an oxide layer is permitted. Subsequently, the third method is ended.

In step 310, an operating state of the soldering device 100 for breaking up an oxide layer is prevented. This makes it possible to interrupt the soldering process and break up the oxidation layer only if the degree of oxidation requires it. Subsequently, the third method is ended.

The third method may be repeated regularly or irregularly during operation of the soldering device 100.

The invention claimed is:

1. Method for operating a soldering device,
    capturing a graphic representation of at least part of the soldering device;
    determining an instantaneous operating state of the soldering device from the graphic representation by automated processing of the graphic representation based on information about the soldering device; determining the information about the soldering device based on a reference representation of at least part of the soldering device; either capturing the reference representation as a graphic representation or reading the reference representation as a graphic representation from a memory, and
    wherein the reference representation characterizes a degree of oxidation of solder when the solder flows out over at least part of a surface of a soldering nozzle of the soldering device.

2. Method according to claim 1, wherein the reference representation characterizes a solder wave having a predetermined height.

3. Method according to claim 2, wherein the reference representation is captured when an instantaneous solder wave reaches the predetermined height.

4. Method according to claim 3, comprising the further step of arranging in the soldering device a crucible of the soldering device or a soldering nozzle of the soldering in a predetermined position, wherein the reference representation is captured when a circuit through which a current flows through the instantaneous solder wave and a contact is closed.

5. Method according to claim 1, comprising the following step:
    comparing the information about the graphic representation is with information about the reference representation, wherein based on a result of the comparison, at least one of the following is performed: a deviation of an instantaneous height of the instantaneous soldering wave from the predetermined height is detected and/or an operating state of the soldering device for solder wave height measurement is selectively permitted or prevented.

6. Method according to claim 1, wherein the reference representation characterizes a soldering nozzle which can be inserted into the soldering device.

7. Method according to claim 6, comprising the following step:
    comparing the information about the graphic representation is compared with information about the reference representation, wherein based on a result of the comparison, at least one of the following is performed: a soldering nozzle currently inserted in the soldering device is detected and/or an operating state of the soldering device for soldering using the inserted soldering nozzle is selectively permitted or prevented.

8. Method according to claim 1, comprising the following step:
    comparing the information about the graphic representation is compared with information about the reference representation, wherein based on a result of the comparison, at least one of the following is performed: detecting an instantaneous degree of oxidation of the solder when the solder flows out over at least part of a surface of the soldering nozzle or selectively permitting or preventing an operating state of the soldering device for breaking up an oxide layer in the solder.

9. Soldering device comprising a capturing means and a computing means, the capturing means being designed to capture a graphic representation of at least part of the soldering device, the computing means being designed to determine an instantaneous operating state of the soldering device by means of automated processing of the graphic representation information about the soldering device, characterized in that the computing means is designed to determine the information about the soldering device based upon a reference representation of at least part of the soldering device, the capturing means being designed to capture the reference representation as a graphic representation, or the computing means being designed to read the graphic representation from a memory, and in that the reference representation characterizes a degree of oxidation of a solder when the solder flows out over at least part of a surface of a solder nozzle of the soldering device.

10. Soldering device according to claim 9, characterized in that the reference representation characterizes a solder wave having a predetermined height.

11. Soldering device according to claim 10, characterized in that the capturing means is designed to capture the reference representation when an instantaneous solder wave reaches or exceeds the predetermined height.

12. Soldering device according to claim 11, characterized in that the capturing means is designed to capture the reference representation when a circuit through which a current flows through the instantaneous solder wave and a contact is closed, a crucible of the soldering device or a soldering nozzle of the soldering device being arranged in the soldering device in a predetermined position.

13. Soldering device according to claim 10, characterized in that the computing means is designed to compare information about the graphic representation with information about the reference representation, the computing means being designed, based upon a result of the comparison, to detect a deviation of an instantaneous height of the instantaneous solder wave from the predetermined height and/or to selectively permit or prevent an operating state of the soldering device for solder wave height measurement.

14. Soldering device according to claim 9, characterized in that the reference representation characterizes a soldering nozzle which can be inserted into the soldering device.

15. Soldering device according to claim 14, characterized in that the computing means is designed to compare information about the graphic representation with information about the reference representation, the computing means being designed to detect, based upon a result of the comparison, a soldering nozzle currently inserted in the soldering device and/or to selectively permit or prevent an operating state of the soldering device for soldering using the inserted soldering nozzle.

16. Soldering device according to claim 15, characterized in that the computing means is designed to compare information about the graphic representation with information about the reference representation, the computing means being designed, depending on a result of the comparison, to detect an instantaneous degree of oxidation of the solder and/or to selectively permit or prevent an operating state of the soldering device for breaking up an oxide layer in the solder.

* * * * *